(12) United States Patent
Patrick

(10) Patent No.: US 6,446,782 B1
(45) Date of Patent: Sep. 10, 2002

(54) SHUTTLE TOP DIVERTER

(75) Inventor: Richard B. Patrick, Denton, TX (US)

(73) Assignee: Rapistan Systems Advertising Corp., Grand Rapids, MI (US)

(*) Notice: Subject to any disclaimer, the term of this patent is extended or adjusted under 35 U.S.C. 154(b) by 23 days.

(21) Appl. No.: 09/596,357

(22) Filed: Jun. 16, 2000

(51) Int. Cl.[7] ............................................. B65G 47/10
(52) U.S. Cl. .................................................. 198/370.06
(58) Field of Search ................................... 198/370.06

(56) References Cited

U.S. PATENT DOCUMENTS

| | | | |
|---|---|---|---|
| 3,026,988 A | 3/1962 | Fisk | 198/24 |
| 3,045,801 A | 7/1962 | Graybeal | 198/24 |
| 3,246,733 A | 4/1966 | Torbet et al. | 198/185 |
| 4,298,117 A | 11/1981 | Kobayashi et al. | 198/367 |
| 4,321,994 A | 3/1982 | Heuft | 198/436 |
| 4,441,604 A | 4/1984 | Schlig et al. | 198/598 |
| 4,643,291 A | 2/1987 | Counter et al. | 198/356 |
| 4,781,281 A * | 11/1988 | Canziani | 198/365 |
| 4,815,582 A * | 3/1989 | Canziani | 198/365 |
| 5,010,998 A | 4/1991 | MacMillan | 198/372 |
| 5,217,104 A | 6/1993 | Pelletier | 198/367 |
| 5,452,786 A | 9/1995 | Gilmore | 198/367 |
| 5,547,084 A * | 8/1996 | Okada et al. | 198/370.06 X |
| 5,690,209 A * | 11/1997 | Kofoed | 198/370.06 |
| 6,005,211 A * | 12/1999 | Haung et al. | 198/370.06 X |
| 6,068,105 A | 5/2000 | Darwish et al. | 198/370.02 |
| 6,209,703 B1 * | 4/2001 | Soldavini | 198/370.06 |

FOREIGN PATENT DOCUMENTS

| | | |
|---|---|---|
| DE | 2242457 | 4/1973 |
| DE | 2620036 | 11/1977 |
| DE | 311699 A1 | 11/1982 |
| FR | 2448944 | 12/1980 |
| JP | 5836820 | 3/1983 |
| JP | 5982220 | 5/1984 |
| JP | 60 232320 | 11/1985 |

* cited by examiner

Primary Examiner—Stephen T. Gordon
Assistant Examiner—Lori L Coletta
(74) Attorney, Agent, or Firm—Van Dyke, Gardner, Linn & Burkhart, LLP (57) ABSTRACT

A transfer assembly of the present invention provides for a low impact transfer of an article between conveyors so that the article can be diverted from a direction of flow without impeding the flow of other articles in the conveyor system. The transfer is done at a relatively fast rate while maintaining the impact on the article to a minimum. The transfer assembly includes a conveying surface and a pusher which is adapted to move across a first portion of the conveying surface from a retracted position adjacent the first portion to an extended position across the first portion adjacent a second portion of the conveying surface for translating an article being conveyed on the conveying surface and for transferring the article from a first conveyor section to a second laterally offset conveyor section.

37 Claims, 10 Drawing Sheets

SHUTTLE TOP DIVERTER

TECHNICAL FIELD AND BACKGROUND OF THE INVENTION

The present invention generally relates to a transfer assembly and, more particularly, to a low impact transfer assembly which can be used to transfer articles from one conveyor to another conveyor.

Transfer conveyors for transferring articles or sorting articles from a conveyor onto take-away conveyors are well known in the art. Typically, the transfer assembly includes a pusher arm which moves across the conveyor to an extended position to push an article from the conveyor to the take-away conveyor which is often angled with respect to the first conveyor. These pusher arms have taken many forms and, until recently, have not achieved high transfer rates while maintaining the impact on the article to a minimum. One recent diverter which has successfully achieved high sortation rates while maintaining a low impact on the article is disclosed in pending U.S. patent application Ser. No. 08/933,818, entitled "LOW IMPACT ARTICLE DIVERTER ASSEMBLY," now U.S. Pat. No. 6,068,105, which is commonly assigned to Mannesmann Dematic of Grand Rapids, Mich., the disclosure of which is herein incorporated by reference in its entirety. Rather than blocking the forward motion of the article, the low impact diverter of the Mannesmann diverter assembly transforms the forward motion of the article into a lateral motion across the conveyor onto the take-away conveyor.

In some applications, it may be desirable to move an article between two generally parallel conveyors. For example, when articles are conveyed on a conveyor through an x-ray machine and it is determined that an article requires manual inspection, the conveyor passing through the x-ray machine is stopped so that the article can be inspected while remaining on the conveyor. Thus, the flow of passengers through the x-ray area is often impeded when an article requires manual inspection. In order to minimize the impact on the flow of the articles through the x-ray machine, some operators remove the article from the conveyor and place the article on a table where it is manually inspected. However, this requires manual lifting by the operator and, further, requires the operator to be distracted from the operation of the x-ray again slowing the flow of passengers through the x-ray area.

Consequently, there is a need for a transfer assembly which can transfer an article from a first conveyor to a second adjacent and generally parallel conveyor for diverting the article to the second conveyor while maintaining the flow of the first conveyor generally constant. In addition, there is need for a transfer device which can achieve this transfer at a relatively fast sortation rate to avoid creating any impedance to the flow on the first conveyor while providing a low impact to the article being transferred so that any fragile or breakable objects contained in the article will not be damaged during the transfer.

SUMMARY OF THE INVENTION

Accordingly, a transfer assembly of the present invention provides for a low impact transfer of an article from a first conveyor to a second diverting conveyor, so that articles can be diverted from the first conveyor to the second diverting conveyor without impeding the flow of the first conveyor. This transfer is done at a relatively fast rate while maintaining the impact on the article at a minimum.

In one form of the invention, a transfer assembly for transferring articles between two conveyor sections, which are offset laterally from one another, includes a conveying surface and a pusher. The pusher is adapted to move across a first portion of the conveying surface, from a retracted position adjacent the first portion, to an extended position across the first portion adjacent a second portion of the conveying surface for translating an article being conveyed on the conveying surface and for transferring the article from the first conveyor section to the second conveyor section.

In one aspect, the pusher initially moves across the first portion at a first speed to contact the article and then moves the article across the first portion a second speed, wherein the first speed is less than the second speed thereby generating a low impact with the article. In further aspects, the pusher straddles the conveying surface. For example, the transfer assembly may include a frame, with the frame supporting the conveying surface, and the pusher being movably supported by the frame. In one form, the pusher is movably supported by the frame by a pair of rails.

In further aspects, the pusher includes downwardly depending portions which straddle the conveying surface, with the downwardly depending portions being interconnected by a transverse member and being movably supported by the transverse member on the frame. The transverse member may be moved laterally across the frame, for example, by a rotating arm. The rotating arm preferably includes a wheel which engages the transverse member and drives the transverse member to move the pusher from the retracted position to the fully extended position and back to the retracted position.

According to another form of the invention, a conveyor system includes a first conveyor section, a second conveyor section, and a third conveyor section which is positioned between the first and second conveyor sections. The second conveyor section is offset from the first conveyor section and is generally parallel to the first conveyor section. The third conveyor section includes a conveying surface having a first portion positioned adjacent the output end of the first conveyor section and a second portion which is positioned adjacent the input end of the second conveyor section. The third conveyor section includes a transfer assembly which is adapted to translate an article conveyed on the conveying surface between the first and second portions of the conveying surface to transfer the article from the first conveyor section to the second conveyor section.

In one aspect, the transfer assembly includes a pusher member and a driver which moves the pusher member across the first portion of the conveying surface. The pusher member straddles the conveying surface and includes downwardly depending portions which are interconnected by a transverse member, which is supported by rails. Preferably, the transverse member is driven by the driver and moves the pusher member between the retracted position to the fully extended position. For example, the driver may include a wheel which engages the transverse member to drive the transverse member. In preferred form, the wheel is driven in a circular path to move the pusher member across the first portion of the conveying surface. In further aspects, the wheel is driven in a circular path with a constant velocity whereby the pusher member moves a first speed over the first portion of the conveying surface to contact the article conveyed on the conveying surface and moves the article across the first portion a second speed which is faster than the first speed whereby the pusher member minimizes the initial impact with the article.

In other aspects, the third conveyor section includes a frame. The conveying surface is rotatably supported in the frame and may comprise, for example, a rotatable belt.

In yet another form of the invention, a conveyor system includes a first conveying section, a second conveyor section, and a third conveyor section which is positioned between the first and second conveyor sections. The first and second conveyor sections are substantially parallel and are offset with respect to each other whereby a first portion of the conveying surface of the third conveyor section aligns with the output end of the first conveyor and a second portion of the conveying surface aligns with the input end of the second conveyor section. The third conveyor section is adapted for transferring articles from the first conveyor section to the second conveyor section with a low impact.

According to yet another form of the invention, a transfer assembly includes a conveying surface and a pusher adapted to move across said conveying surface in a translation direction generally orthogonal to the direction of flow of the conveying surface from a retracted position adjacent said conveying surface to an extended position across said conveying surface for translating across said conveying surface in the translation direction.

In one aspect, the pusher straddles said conveying surface. Preferably, the transfer assembly includes a frame, which supports the conveying surface, with the pusher being movably supported on the frame. For example, the pusher is movably supported on said frame by a pair of rails.

In further aspects, the pusher moves across a first portion of the conveying surface at a first speed and moves across a second portion of the conveying surface to move the article at a second speed, wherein said first speed is slower than said second speed thereby minimizing the impact on the article. For example, transfer assembly may include a driver and driver arm, which is rotated by the driver and with pusher member moved across the conveying surface by the rotating driver arm. Preferably, the driver arm rotates in a circular path and, more preferably, at a generally constant angular velocity.

These and other objects, advantages, purposes, and features of the invention will become more apparent from the study of the following description taken in conjunction with the drawings.

DETAILED DESCRIPTION OF THE PREFERRED EMBODIMENTS

Figure 1:
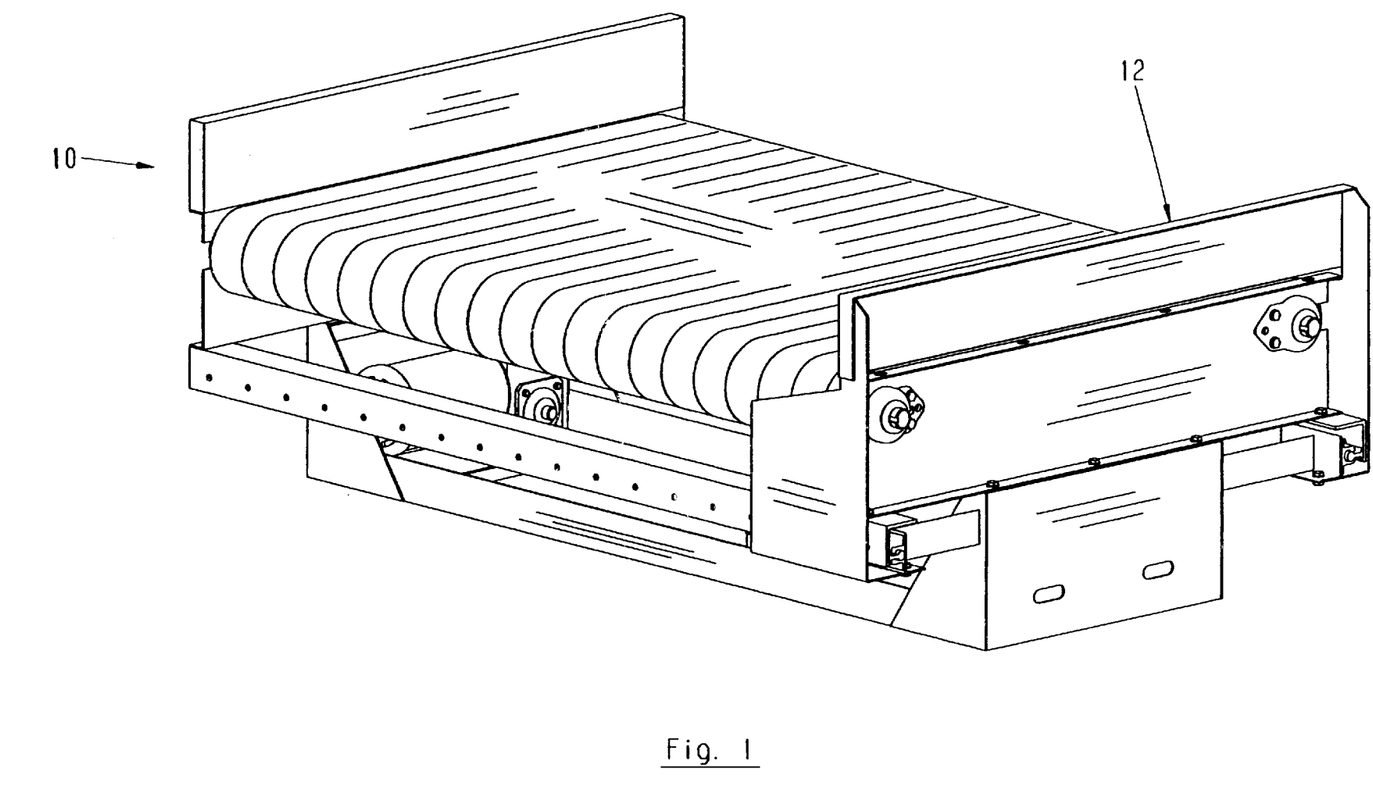
FIG. 1 is a perspective view of a conveyor section incorporating the transfer assembly of the present invention.
Figure 2:
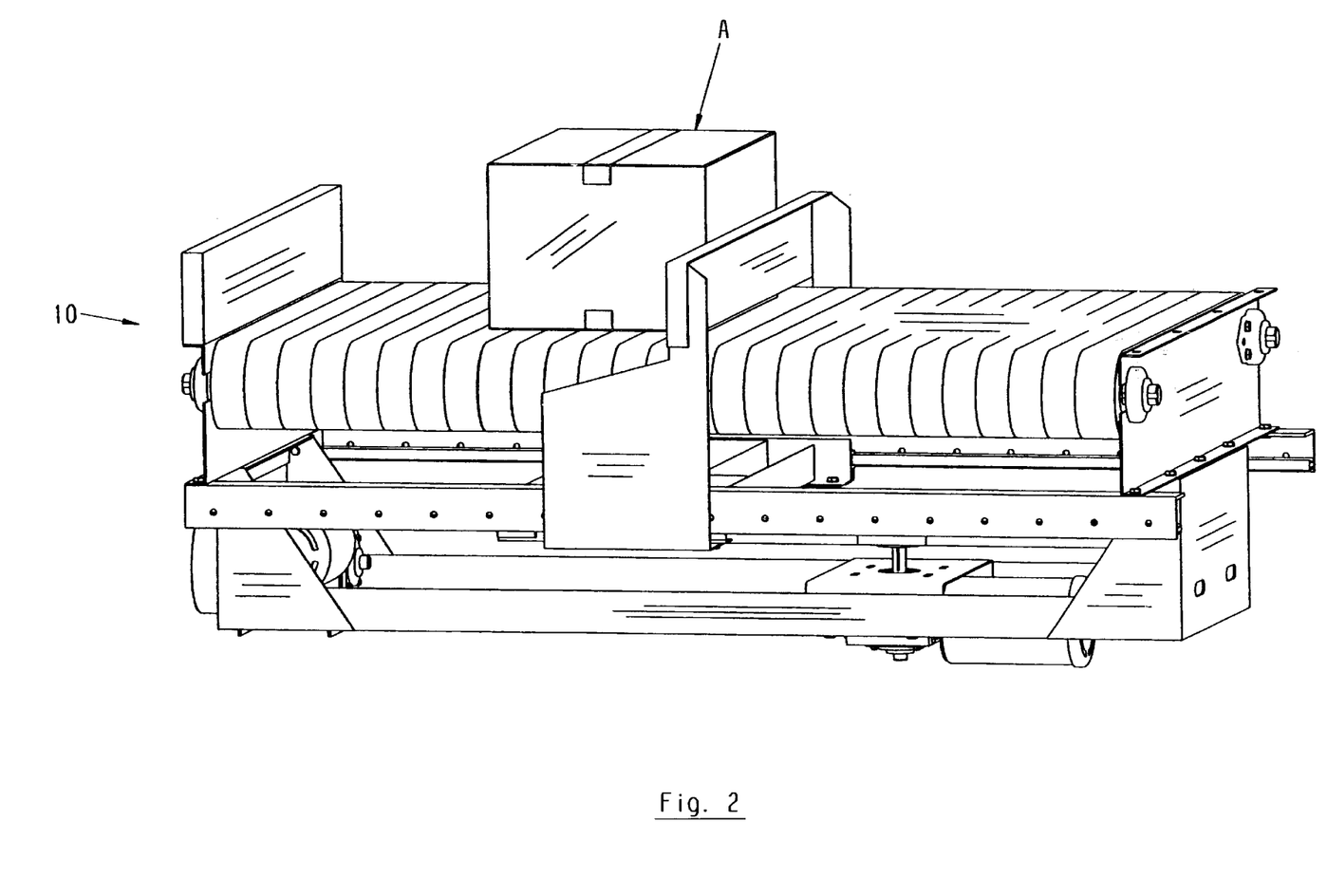
FIG. 2 is an end view of the conveyor section of FIG. 1 illustrating the transfer assembly moved from its home position to its fully extended position in which an article is transferred from one side of the conveyor section to another side of the conveyor section for aligning with a take-away or diverter conveyor.
Figure 3:
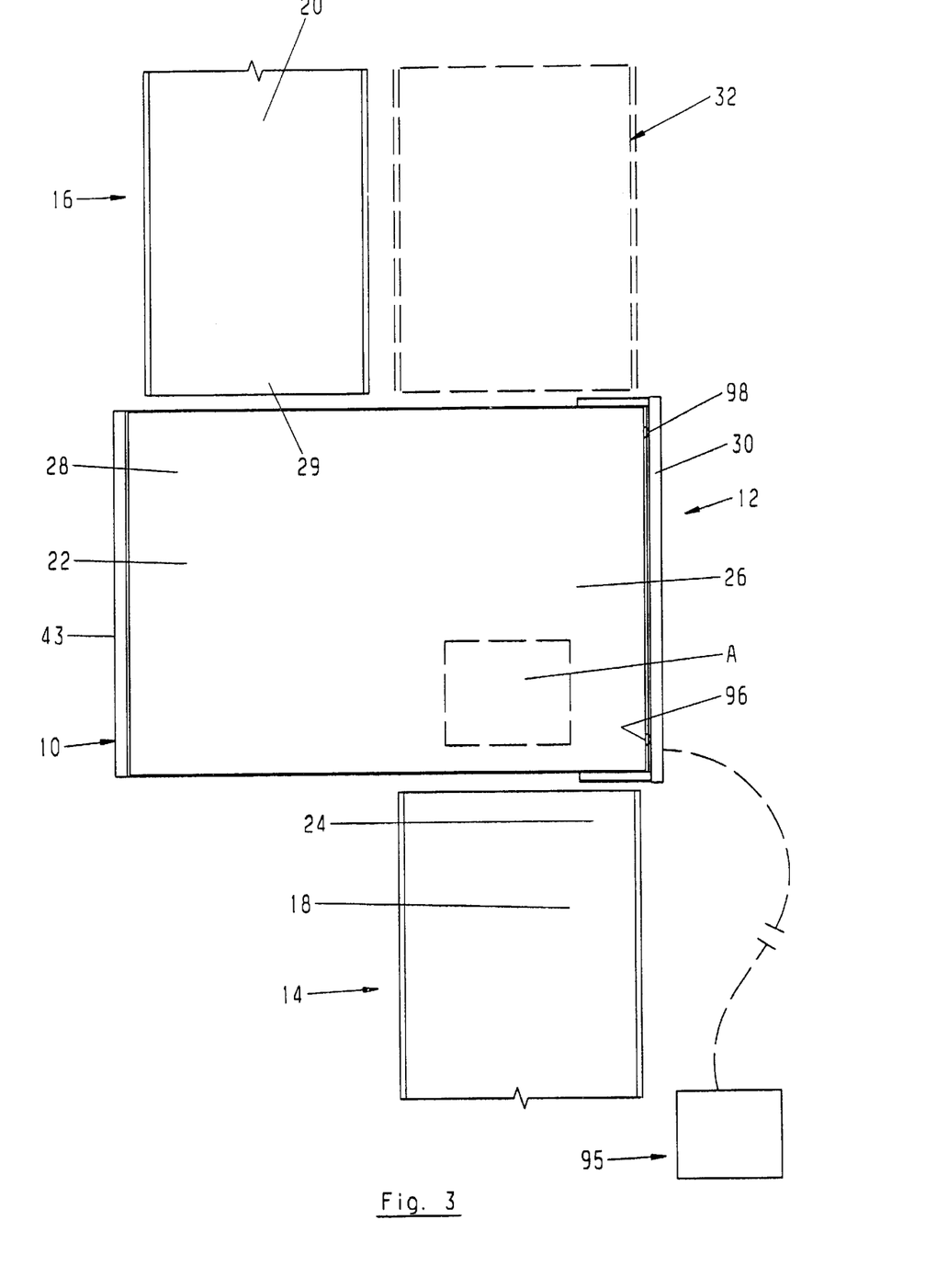
FIG. 3 is a top plan view of a conveyor system incorporating the conveyor section of FIG. 1.

Referring to FIG. 1, the numeral 10 generally designates a conveyor section with a transfer assembly 12 of the present invention. As will be more fully described below and as best seen in FIG. 3, conveyor section 10 is suitable for positioning between two offset, but generally parallel conveyor sections 14 and 16 to translate one or more articles at 90° to the flow of the article or articles. For example, conveyor section 10 is particularly suitable for use in a baggage inspection station where a conveyor passes the luggage or article through an x-ray machine and then delivers the article to the passenger once the passenger has passed through a personal screening device provided the article is examined and cleared. However, if the article requires closer inspection, for example manual inspection, conveyor section 10 diverts the article onto second conveyor section 16 which moves the article to an inspection location. In this manner, the flow through the inspection area is not hindered by the need to manually inspect an article.

Referring again to FIG. 3, conveyor section 10 is positioned between first conveyor section 14 and second conveyor section 16 for transferring articles being conveyed on the conveying surface 18 of the first conveyor section 14 to the conveying surface 20 of the second conveyor section 16. In other words, transfer assembly 12 translates an article across conveying surface 22 at 90° to the flow of the conveying surface. It should be understood that conveying surfaces 18 and 20 may comprise belt driven conveying surfaces, rollers, or the like. Transfer assembly 12 translates across a first portion 26 of the conveying surface 22 of conveyor section 10 to gently push and move an article, which is delivered from the output end 24 of conveyor section 14, to a second portion 28 of the conveying surface 22 which is aligned with the input end 29 of conveyor section 16. In preferred form, transfer assembly 12 includes a pusher member 30 which moves at a first slower speed across the first portion 26 of conveying surface 22 until pusher member 30 contacts article A (FIG. 3) and then pushes and moves article A across conveying surface 22 to second portion 28 at a second faster speed whereby the initial impact with the article being transferred across the conveying surface 22 of conveyor section 10 is minimized. Optionally, conveyor section 10 may be positioned between first and second conveyor sections 16 and, further, between a third conveyor section 32, with the third conveyor section 32 aligned with first portion 26 of conveying surface 22 so that when an article does not require transfer between conveyor sections 14 and 16, the article passes over conveying surface 22 onto the third conveyor section 32. As understood from FIG. 3, the width of assembly 10 is approximately equal to the combined widths of input conveyor section 14 and diverter conveyor section 16 so that conveying surface 22 spans across the output end 24 of conveyor section 14 and input end 29 of conveyor section 16.

Figure 4:
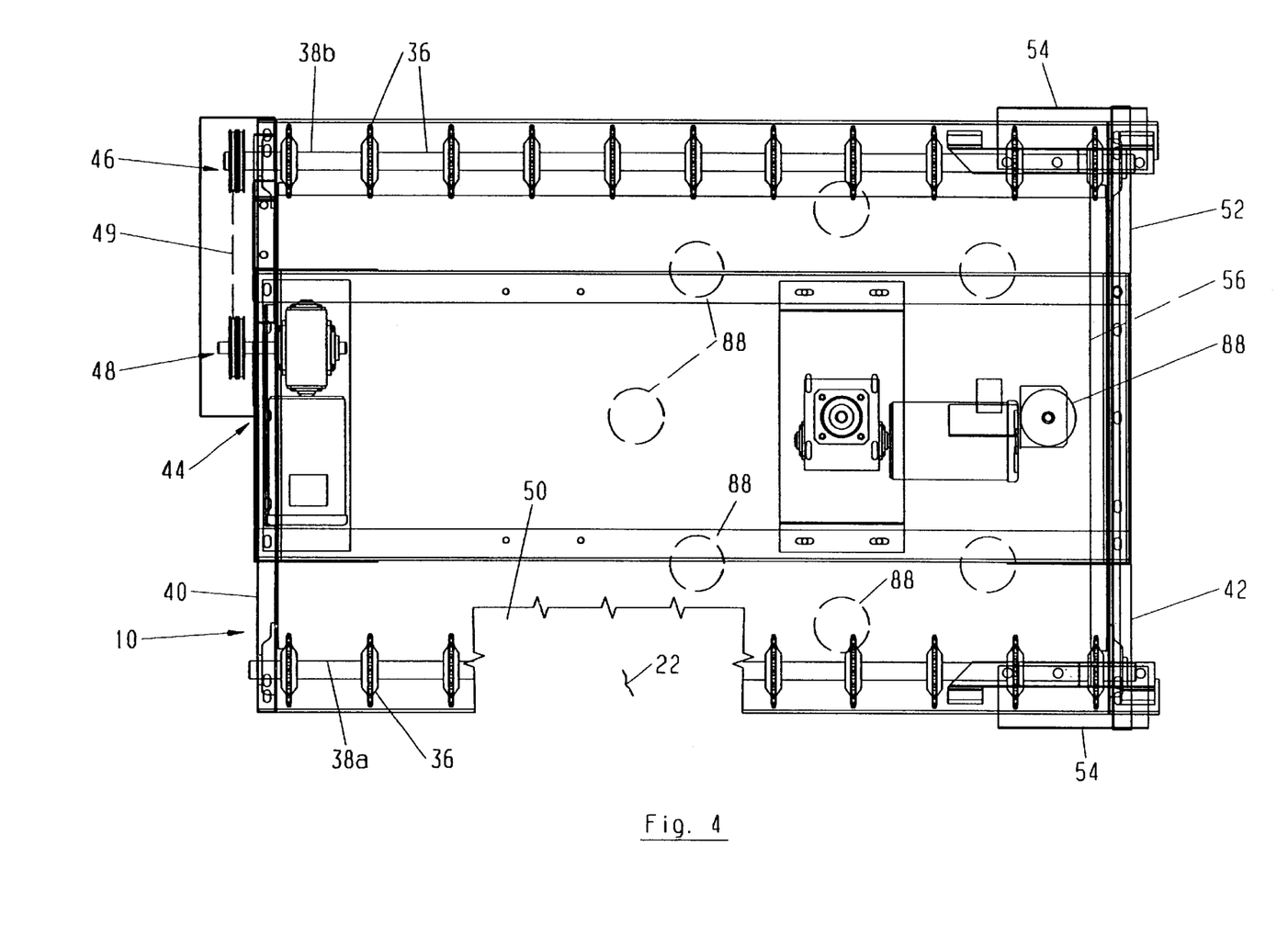
FIG. 4 is a top plan view of the conveyor section of FIG. 1.
Figure 5:
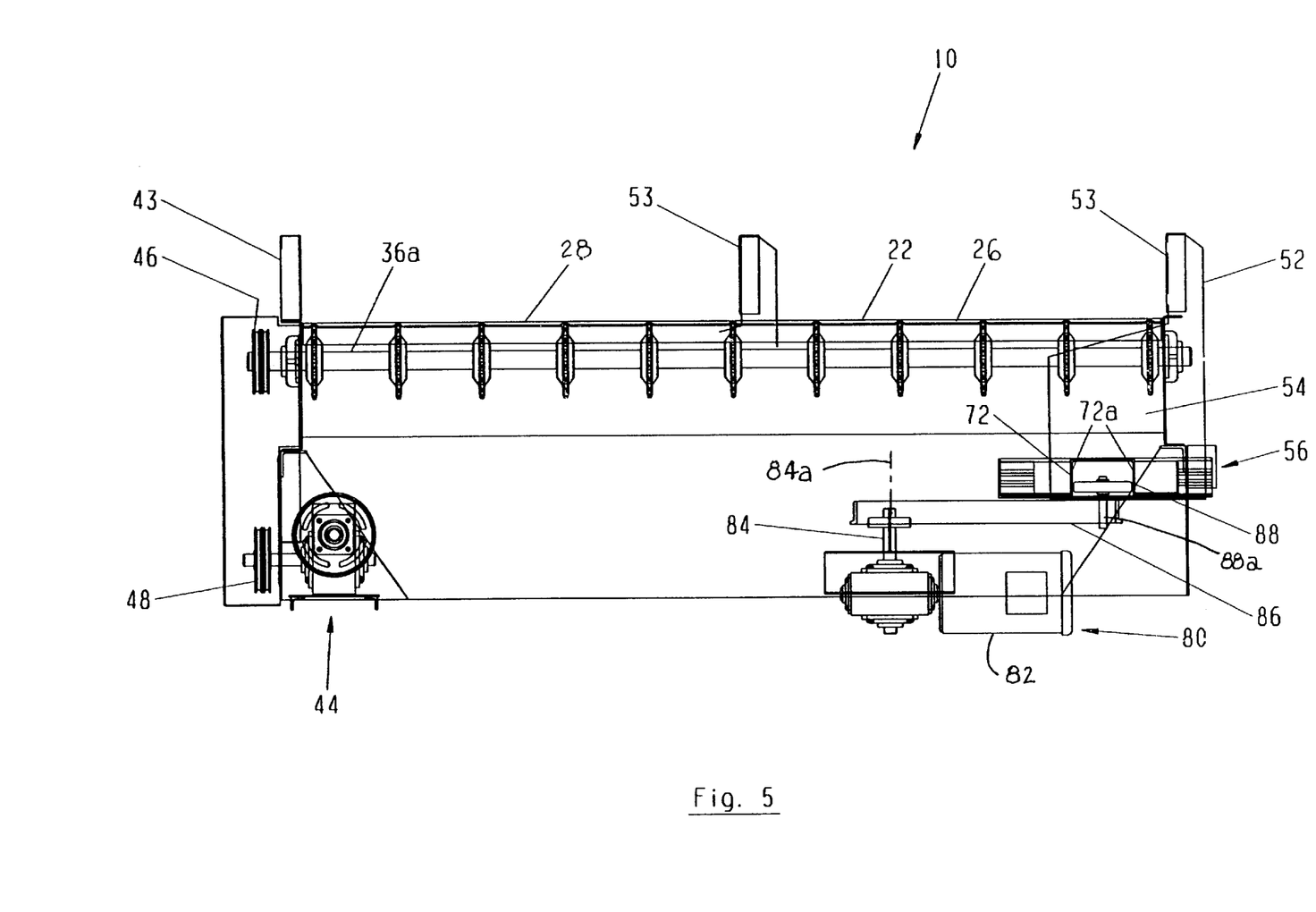
FIG. 5 is a side view of the conveyor section of FIG. 3.

Referring to FIGS. 4 and 5, conveyor section 10 includes a frame 34 which supports a plurality of sprockets or wheels 36 and an endless conveyor belt 50 which extends over and between sprockets 36 to define conveying surface 22. In addition to driving belt 50, sprockets 36 inhibit lateral movement of belt 50 so belt 50 stays in alignment. Frame 34 includes a pair of opposed side frame members 40 and 42 and a guard or side rail 43 positioned over side frame 40 to prevent articles from falling off conveyor section 10. Belt 50 preferably comprises a light weight low friction belt, such as is available from Morse of Emerson Power Transmission. In addition, belt 50 preferably has a solid top surface to provide maximum support to the articles and also a flat smooth surface to minimize catch points, which could otherwise inhibit the transfer of the articles across the belt. Sprockets 36 are supported on and mounted to a pair spaced apart shafts 38a and 38b which are journaled in side frame members 40 and 42 of frame 34. Shaft 38b comprises a drive shaft and is driven by a motor and reducer 44 and gearing 46, which is mounted to drive shaft 38b. Motor 44 includes a drive gear 48 which is coupled by a conventional belt, such as a cog type belt or v-belt or the like, or drive chain 49 to gear 46. In preferred form, when conveyor section 10 is in operation, belt 50 is continuously moving.

Figure 8:
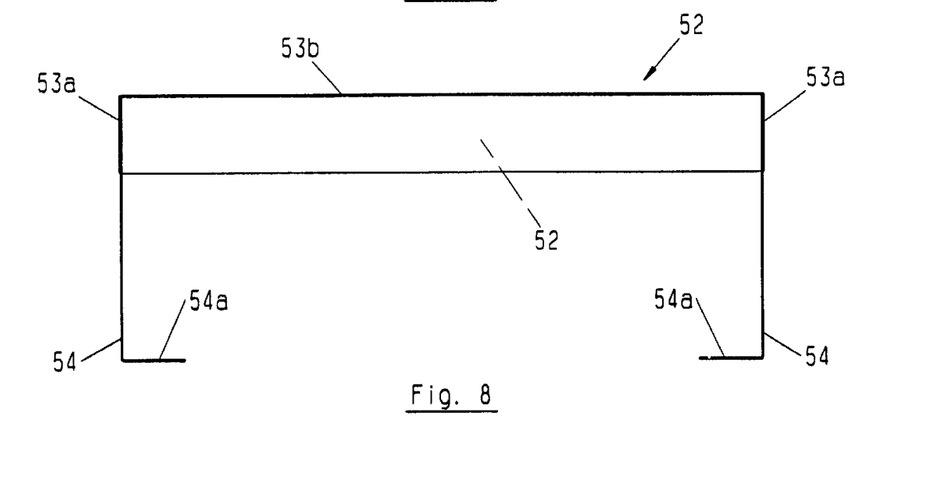
FIG. 8 is an end elevation view of the shuttle member of the transfer assembly of the conveyor section of FIGS. 1–5.
Figure 9:
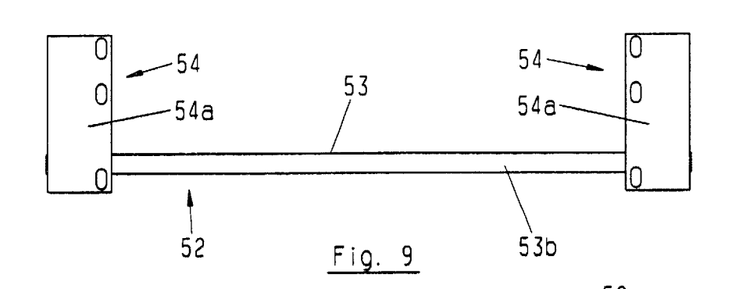
FIG. 9 is a top plan view of the shuttle member of FIG. 8.
Figure 10:
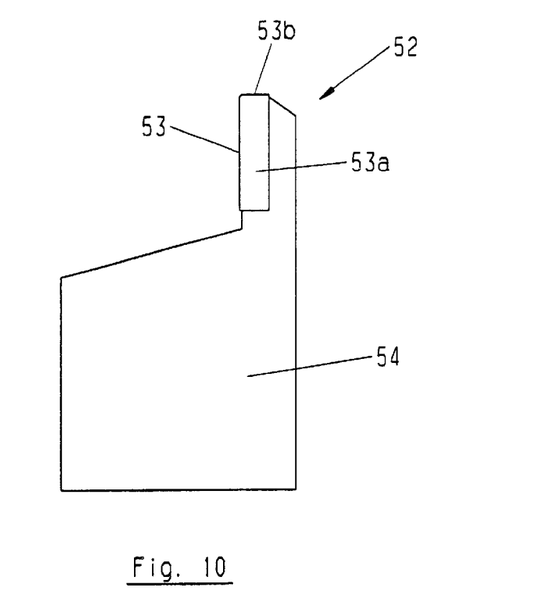
FIG. 10 is a side elevation view of the shuttle member of FIG. 8.

As best seen in FIGS. 4 and 5, transfer assembly 12 includes a pusher member or fence 52 which extends transversely across conveying surface 22 and straddles the length of conveying surface 22 and a pair of downwardly depending sides 54. Pusher member 52 preferably extends across the entire length of conveyor section 10 and, further, preferably includes a solid pressing surface 53, which is spaced above conveying surface 22 of conveyor belt 50 preferably no more than about ⅜ inch to avoid articles from getting jammed under pusher member 52. In addition, pusher member 52 is preferably formed from a light weight member, such as a light weight metal or a plastic material, such as aluminum, which forms a vertical fence or vertical pushing surface 53 and may optionally include an impact absorbing cover or outer layer, such as rubber. As best seen in FIGS. 8–10, pushing surface 53 is formed by a relatively thin sheet or panel member with mounting flanges 53a and 53b for mounting to sides 54. Furthermore, pusher member 52 may include a wiper, such as a rubber skirt or brush, at its lower edge to ensure that loose straps or the like are moved along with the article being transferred by pusher member 52. Alternately, pusher member 52 may comprise a foraminous sheet or panel but preferably covered by an impact absorbing layer, such as foam or the like. In this manner, the weight of pusher member 52 is reduced while maintaining a continuous pushing surface without catch-points.

In its holding non-activated position, pusher member 52 is positioned at side frame member 42 (shown in solid lines in FIG. 5) adjacent conveying surface 22. As will be more fully described below and best seen in FIG. 5, when activated pusher member 52 moves over conveying surface 22 in a generally horizontal and parallel motion perpendicular to the movement of belt 50 over first portion 26 to a fully extended position adjacent second portion 28 (shown in phantom in FIG. 5) to move an article being conveyed on belt 50 so that the article will be aligned and delivered to conveyor section 16. As noted above, pusher member 52 straddles conveying surface 22 and includes downwardly depending sides 54 which mount pusher member 52 to frame 34.

Figure 6:
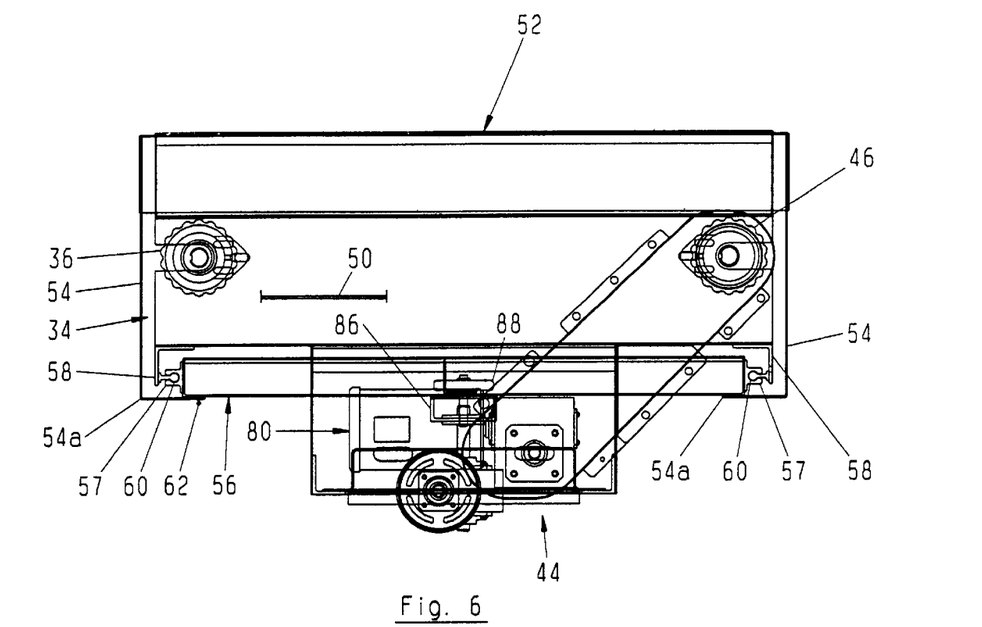
FIG. 6 is an end elevation view of the conveyor section of FIG. 3.

Extending transversely across conveyor section 10 beneath belt 50 is a transverse member or yoke assembly 56, which translates pusher member 52 across conveying surface 22. Referring to FIG. 6, transverse member 56 is mounted to frame 34 by linear bearings 57 on a pair of rails 60, for example linear race support rails, which are respectively mounted to frame 34 by a pair of angle members 58. In this manner, transverse member 56 can be moved laterally across conveyor section 10 beneath belt 50. Sides 54 of pusher member 52 comprise L-shaped members which include an inwardly projecting leg 54a which connect pusher member 52 to transverse member 56 by fasteners, such as mounting bolts 62, to movably mount pusher member 52 to frame 34. In this manner, as transverse member 56 moves along rails 60, pusher member 52 moves across conveying surface 22 to translate the article from first portion 26 to second portion 28 of conveying surface 22.

Figure 11:
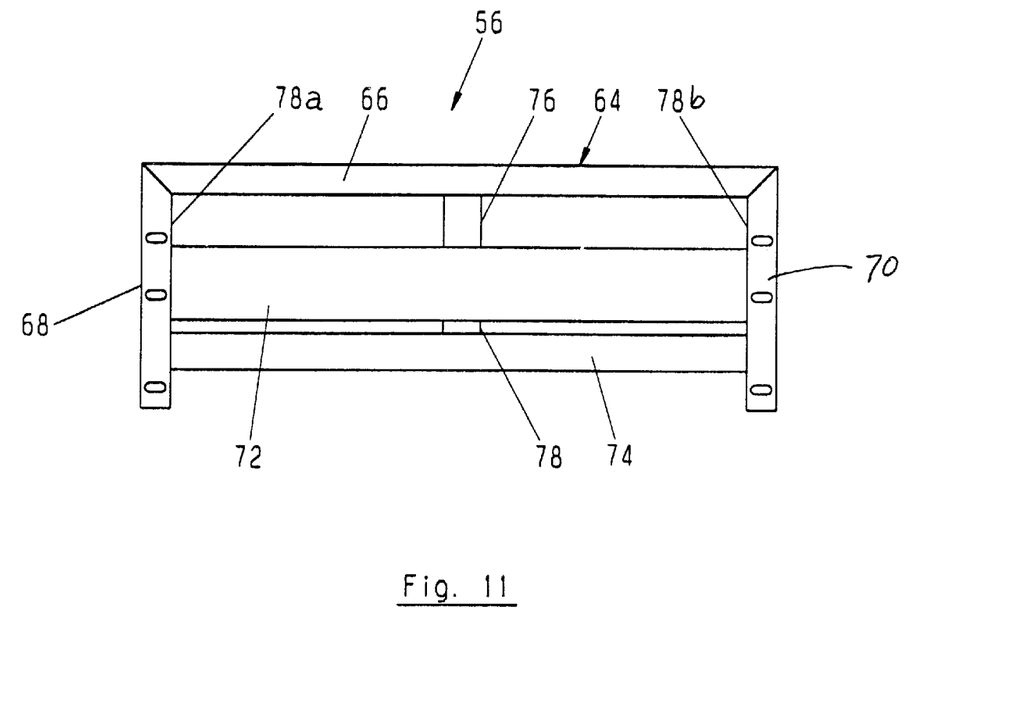
FIG. 11 is a top plan view of a yoke assembly of the transfer assembly of FIGS. 1–5.
Figure 12:
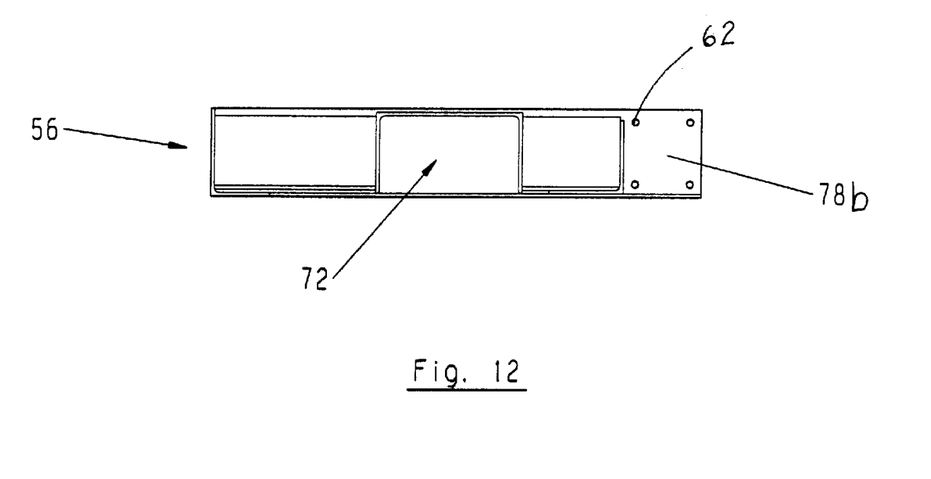
FIG. 12 is a side elevation view of the yoke assembly of FIG. 11.

As best seen in FIG. 11, transverse member 56 comprises a frame 64 formed from a transverse angle member 66 and a pair of longitudinal angle members 68 and 70 which together form a generally U-shaped frame. Extending transversely across frame 64 is an inverted channel member 72 which faces downwardly from conveyor section 10. Frame 64 is reinforced by a second transverse angle member 74, which extends between angle members 68 and 70, and medial support angle members 76 and 78 which extend, respectively, from transverse angle member 66 to channel member 72 and from transverse angle member 74 to channel member 72. Angle members 76, 78, therefore, also provide lateral support to channel member 72. Preferably, the components comprising transverse member 56 are rigidly interconnected, for example by welding. Leg portions 78a and 78b of longitudinal angle members 68 and 70 provide mounting surfaces for fasteners 62 (FIG. 12) and thus together with pusher member 52 form a substantially rigid movable assembly. It should be understood, however, that other open cross-section members or closed cross-section members, such as tubular members, can be used to form frame 64.

Figure 7:
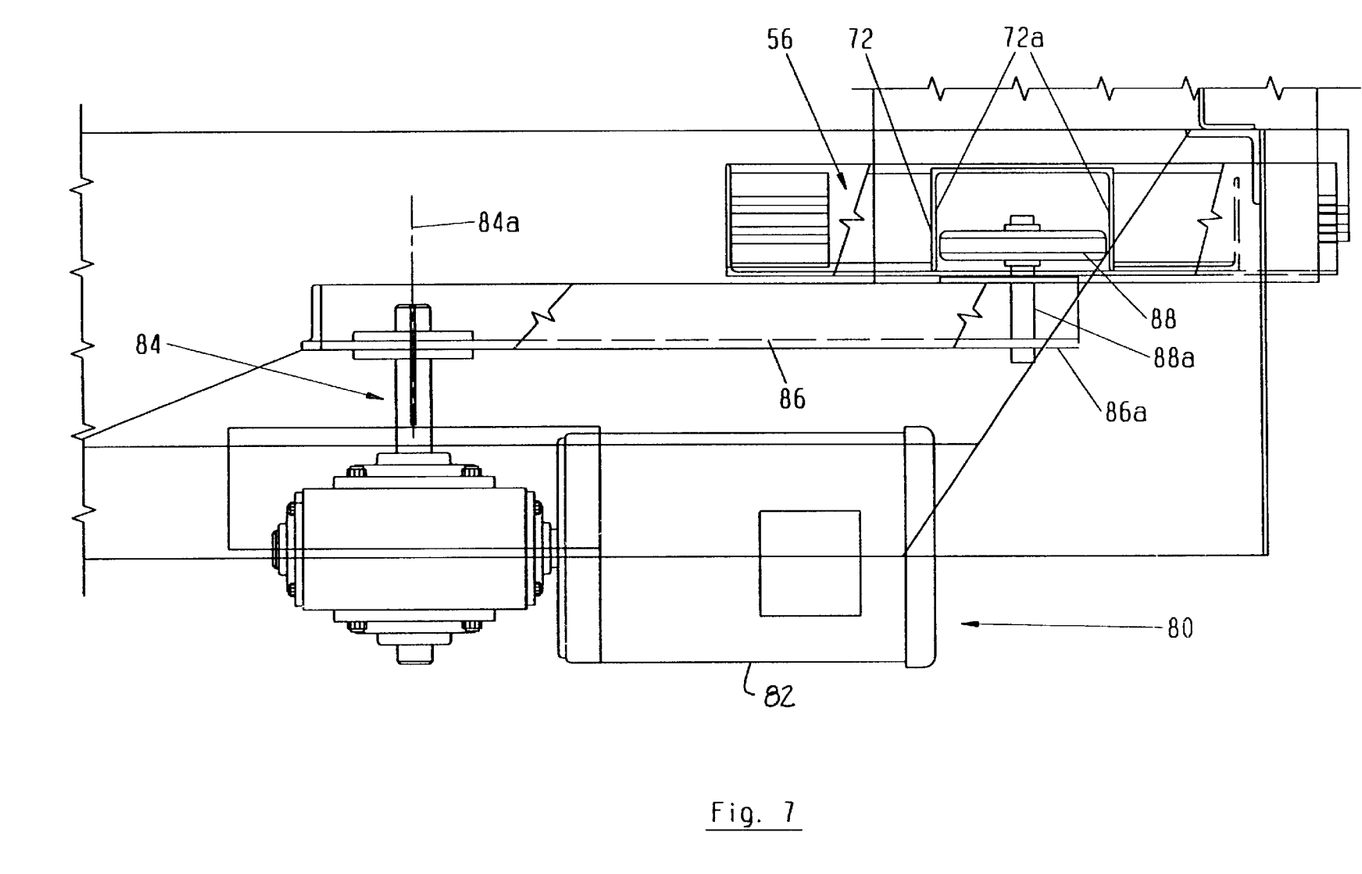
FIG. 7 is an enlarged plan view of the drive assembly of the conveyor section of the present invention.

Referring to FIGS. 5 and 7, transverse member 56 and pusher member 52 are moved laterally across conveyor section 10 on rails 60 by a driver 80. Driver 80 includes a motor 82 with a drive shaft 84 and a driver arm 86. Motor 82 preferably comprises an AC motor, for example 120 Volt AC 3/4 HP motor, and rotates drive shaft 84 360°, preferably at a constant angular velocity. Drive shaft 84 is drivingly coupled to arm 86 and, therefore when driven by motor 82, drive shaft 84 rotates drive arm 86 in a 360° circular path, which moves transverse member 56 and pusher member 52 across first portion 26 of conveying surface 22 between their holding positions (shown in solid in FIG. 5) and extended positions (shown in phantom in FIG. 5) and back to their holding positions, as will be more fully described. Mounted to the end portion 86a of driver arm 86 by a pin or shaft 88a is a roller or wheel 88. Wheel 88 is positioned in channel 72 and engages inner surface 72a of channel 72. As motor 82 rotates drive shaft 84 about its vertical axis 84a and driver arm 86 rotates in its circular path 90 (FIG. 4A), wheel 88 rolls along inner surface 72a of channel 72.

Figure 4A:
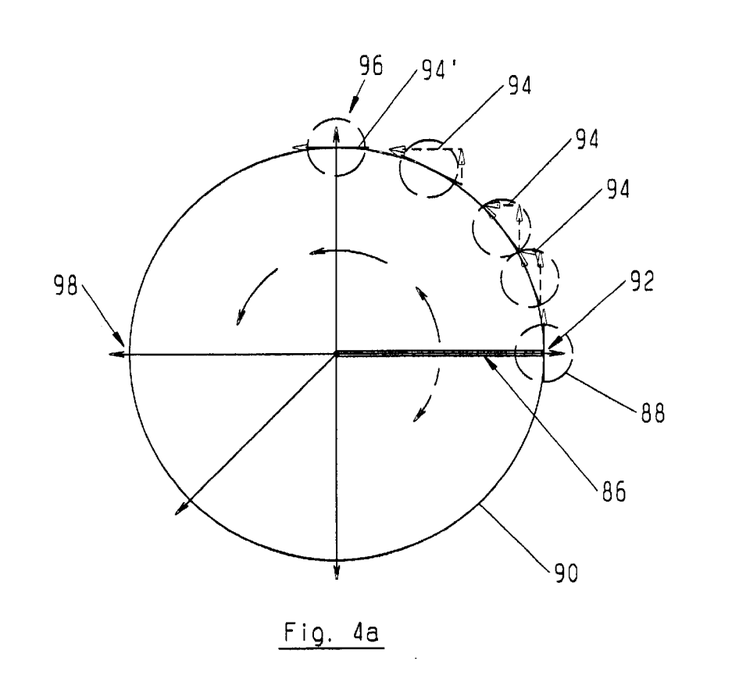
FIG. 4A is a schematic representation illustrating the motion of a driver arm of the transfer assembly and the forces generated by the driver arm.

Referring to FIG. 4A, when driver arm 86 is in its initial position or zero position 92, the angular velocity of driver arm 86 is generally parallel to the direction of flow of conveying surface 22. As driver arm 86 rotates in a counter-clockwise (or clockwise direction), the angular velocity of arm 86 generates a lateral force 94 on channel 72 with wheel 88 which moves pusher member 52 across conveying surface 22. Preferably, arm 86 is rotated at a generally constant angular velocity. As arm 86 continues to move through its circular path 90, the lateral component of the angular velocity increases as illustrated in FIG. 4A. The maximum lateral force 94' occurs when arm 86 is rotated to a 90° position 96, where all the momentum of arm 86 and wheel 56 is imparted laterally to pusher member 52. In this manner, when pusher member 52 initially makes contact with the article on conveying surface 22, the pusher member 52 is moving slowly thus making a low impact on the article. As the pusher member 52 translates across conveying surface 22, the speed of pusher member 52 increases until arm 86 is at its 90° position 96. As arm 86 continues to move through its circular path the lateral force 94 decreases until it reaches zero again at position 98 when arm is 180° with respect to its initial zero position 92. At this position, the article has been translated across conveying surface from first portion 26 to second portion 28 for alignment and delivery to second conveyor section 16. Continued rotation of driver arm 86 returns pusher member 52 to its initial retracted position adjacent conveying surface 22. Since driver arm 86 rotates at a constant angular velocity, the return speed of arm 86 matches the output stroke of transfer assembly 12. It can be appreciated that the control of the speed of pusher member is achieved mechanically. In addition, when pusher member 52 makes initial contact with the article, as described above, the impact is minimal. After contacting the article, however, pusher member 52 is accelerated across first portion 26 of conveying surface to move article A quickly across the conveying surface followed by de-acceleration to permit the momentum of the article to be sufficiently decreased by the friction between the article and belt 50 so that article A does not continue under its own momentum to impact with side rail 43. However, it can be appreciated that the angular speed of driver arm 86 can be varied as desired by controlling motor 82 by the controller described below. Typically, conveyor belt 50 runs constantly with transfer assembly 12 being selectively operated or actuated by a control mechanism, described below. It should be understood that the rate of transfer that can be achieved by conveyor section 10 varies depending on the application, but for example, conveyor section 10 can transfer, for example bags, in a range of about 20 bags per minute to 45 bags per minute.

OPERATION

The operation of conveyor section 10 may vary depending on the application. For example, when assembly 10 is used in conjunction with an inspection station, such as an x-ray station at an airport, the transfer assembly 12 is preferably selectively actuated, for example by the operator of the x-ray machine. As previously described, conveyor section 10 may be positioned at an output end of an x-ray machine conveyor (such as represented by conveyor section 14) with the output end of the x-ray machine conveyor aligned with first portion 26 of conveyor surface 22. A take-away or diverter conveyor (such as represented by conveyor section 16) is then positioned on the output side of conveyor section 10 adjacent second portion 28 of conveying surface 22. A third optional conveyor section, such as conveyor section 32, may be placed adjacent the output end of first portion 26 of conveying surface 22 to deliver the articles or baggage to a pick-up area for the passengers passing through the inspection station.

Transfer assembly 12 may be actuated by a controller 95, such as a PLC. Controller 95 selectively activates motor 84 to activate transfer assembly 12 to move from its retracted position adjacent conveyor section 22 to its extended position across first portion 26 and back to its retracted position in response to signals from the operator of the x-ray machine. For example, when an operator of the x-ray machine detects that an article or baggage requires further inspection, such as manual inspection, the operator will, for example, press a button or the like which sends a signal to controller 95 to initiate the transfer sequence. Therefore, when no signal is received, article A is allowed to transfer across conveying surface 22 to an optional receiving conveyor, such as conveyor 32. It should be understood that controller 95 may receive input from other sources other than the operator of the x-ray machine. In addition, a photo-eye 96 may be positioned on conveyor section 10 to detect when the article in question transfers onto conveyor section 10. In this manner, when the controller receives the signal from the operator of the x-ray machine and the signal from the photo-eye, the controller will actuate the transfer assembly 12 to move the article across first portion 26 to second portion 28 of conveyor surface 22. A second photo-eye 98 may be positioned at the home position of the pusher member such that when the motor makes a full revolution and the pusher member is returned to its home position, the photo-eye will generate a signal which is transferred to controller 95 to stop motor 82, leaving pusher member 52 in its home or holding position until it is then activated again by the operator. It should be understood that the transfer assembly may be used in a number of different applications, for example, conveyor section 10 may be used in material handling or the like.

Figure 13:
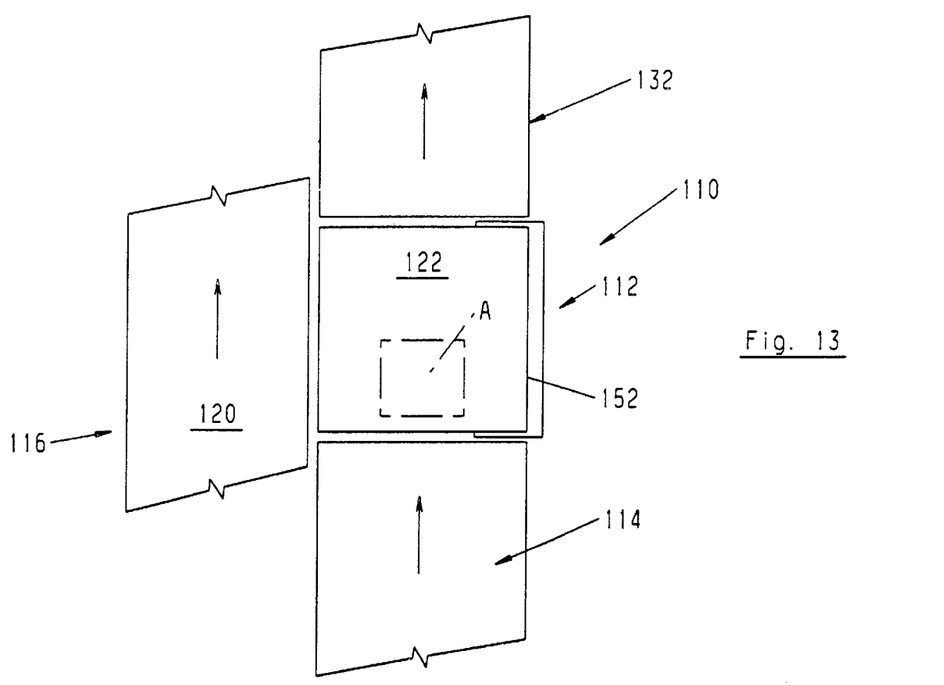
FIG. 13 is a similar view to FIG. 3 illustrating a conveyor system incorporating a second embodiment of the transfer assembly of the present invention.

Referring to FIG. 13, a second embodiment of a conveyor section 110 with a transfer assembly 112 of the present invention is illustrated. Conveyor section 110 is suitable for positioning between a first, incoming conveyor section 114 and a second outgoing conveyor section 132 to translate one or more articles A to an adjacent generally parallel conveyor section 116. Conveyor section 110 is of similar construction to conveyor section 10 but has a conveying surface with approximately a width equal to the width of conveyor section 114 and 132 and is, therefore, approximately half of the width of conveyor section 10. Transfer assembly 112 is of similar construction to transfer assembly 12 of the previous embodiment and includes a pusher member 152 which translates across the conveying surface of conveyor section 110 to selectively translate one or more articles at a 90° angle to the flow of the articles across conveyors 114 and 132.

In the illustrated embodiment, conveyor section 110 includes a conveying surface 122 over which the article is moved when transfer assembly 112 is activated. Additionally, since the article is translated laterally for delivery to conveyor section 116, conveyor section 110 does not include a rail such as rail 43 of conveyor section 10 since the article must transfer across the full width of conveying surface 122 of conveyor section 110 and over the free edge of conveying surface 122 for delivery onto conveying surface 120 of conveyor section 116 as will be understood by those skilled in the art. In addition, transfer assembly 112 preferably moves across the full width of the conveying surface 122 of conveyor section 110 in order to transfer article A onto surface 120 of conveyor section 116. Similar to the previous embodiment, however, pusher member 152 moves across conveying surface 122 at a first speed to contact article A and then moves article A across the conveying surface 122 a second faster speed in order to provide a high sortation rate. Preferably, the speed of conveying surface 122 along the direction of flow is generally matched with the speed of the conveying surface 120 of conveyor section 116. In this manner, the impact on article A is further minimized.

Figure 14:
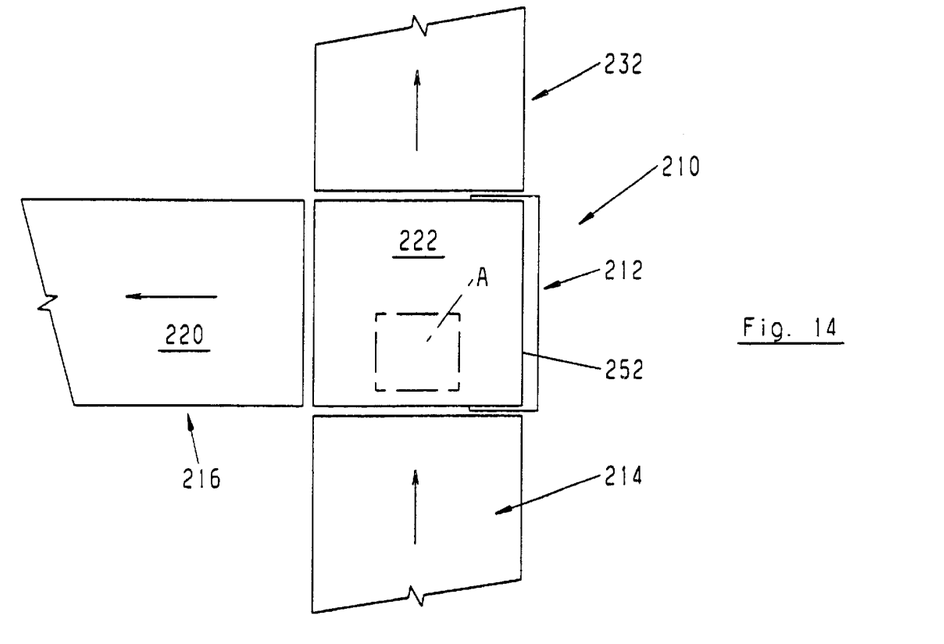
FIG. 14 is a similar view to FIGS. 3 and 13 illustrating a second embodiment of a conveyor system incorporating the transfer assembly of FIG. 13.

Referring to FIG. 14, a third embodiment of a conveyor section 210 of the present invention is illustrated. Conveyor section 210 is of similar construction to conveyor section 110 and includes a transfer assembly 212 with a pusher member 252 which translates across conveying surface 222 of conveyor section 210 for translating an article A across conveying surface 222 for delivery to conveyor section 216. In the illustrated embodiment, conveyor section 210 is positioned between a first conveyor section 214 and a second conveyor section 232 and, further, is adjacent a take-away conveyor section 216. Conveying section 216 includes a conveying surface 220 that defines a direction of flow generally orthogonal to the direction of flow of conveyor sections 214 and 232 and, further, to the direction of flow of conveying surface 222 of conveyor section 210.

While several forms of the invention have been shown and described, other forms will now be apparent to those skilled in the art. For example, the specific configuration of transverse member 56, frame 34, or pusher member 52 may be varied, including for example, by adding further reinforcing members or by eliminating reinforcing members. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

I claim:

1. A transfer assembly for transferring articles between a first conveyor section and a second conveyor section, the second conveyor section being offset laterally from the first conveyor section, said transfer assembly comprising:

a conveying surface defining a direction of flow, said conveying surface comprising a driven belt and having a first portion for aligning with the first conveyor section for receiving articles from the first conveyor and a second portion for aligning with the second conveyor section for transferring articles to the second conveyor section; and a pusher adapted to move laterally in a direction generally orthogonal to said direction of flow across said first portion of said conveying surface from a retracted position adjacent said first portion to an extended position across said first portion adjacent said second portion for translating an article being conveyed on said first portion of said conveying surface to said second portion of said conveying surface in said direction generally orthogonal to said direction of flow for transferring the article from the first conveyor section to the second conveyor section.

2. The transfer assembly according to claim 1, wherein said pusher initially moves across said first portion at a first speed to contact the article, and said pusher moving said article across said first portion at a second speed, wherein said first speed is less than said second speed whereby said pusher generates a low impact with the article.

3. The transfer assembly according to claim 1, wherein said pusher straddles said conveying surface.

4. The transfer assembly according to claim 3, further comprising a frame, said frame supporting said conveying surface, and said pusher is movably supported by said frame.

5. The transfer assembly according to claim 4, wherein said pusher is movably supported by said frame by a pair of rails.

6. A transfer assembly for transferring articles between a first conveyor section and a second conveyor section, the second conveyor section being offset laterally from the first conveyor section, said transfer assembly comprising:

a conveying surface defining a direction of flow, said conveying surface having a first portion for aligning with the first conveyor section for receiving articles from the first conveyor and a second portion for aligning with the second conveyor section for transferring articles to the second conveyor section;

a pusher adapted to move laterally in a direction generally orthogonal to said direction of flow across said first portion of said conveying surface from a retracted position adjacent said first portion to an extended position across said first portion adjacent said second portion for translating an article being conveyed on said first portion of said conveying surface to said second portion of said conveying surface in said direction generally orthogonal to said direction of flow for transferring the article from the first conveyor section to the second conveyor section, said pusher initially moving across said first portion at a first speed to contact the article, said pusher moving said article across said first portion at second speed, wherein said first speed is less than said second speed whereby said pusher generates a low impact with the article; and a frame, said frame supporting said conveying surface, said pusher being movably supported by said frame and straddling said conveying surface, and said pusher including downwardly depending portions straddling said conveying surface, said downwardly depending portions being interconnected by a transverse member and being movably supported by said transverse member on said frame.

7. The transfer assembly according to claim 6, wherein said transverse member is moved laterally across said frame by a rotating arm.

8. The transfer assembly according to claim 7, wherein said rotating arm includes a wheel, said wheel engaging said transverse member and driving said transverse member to move said pusher from said retracted position to said fully extended position and back to said retracted position.

9. The transfer assembly according to claim 7, wherein said rotating arm rotates 180° to drive said pusher member from said retracted position to said fully extended position adjacent said second portion of said conveying surface.

10. A conveyor system comprising:

a first conveyor section having an output end and a conveying surface;

a second conveyor section having an input end and a conveying surface, said first conveyor section being offset laterally from said second conveyor section and being generally parallel to said second conveyor section; and a third conveyor section positioned between said first conveyor section and said second conveyor section and having a conveying surface with a width dimension spanning across said conveying surfaces of said first and second conveyor sections and a length dimension initiating at said output end of said first conveyor section and terminating at said input end of said second conveyor section, said conveying surface having a direction of flow and a first portion positioned adjacent said output end of said first conveyor section and a second portion positioned adjacent said input end of said second conveyor section, said third conveyor section including a transfer assembly, said transfer assembly having a pusher member, said pusher member straddling said conveying surface over said length of said conveying surface and moving across said conveying surface to translate an article conveyed on said conveying surface in a transfer direction generally orthogonal to said direction of flow between said first portion and said second portion to transfer the article from said first conveyor section to said second conveyor section.

11. The conveyor system according to claim 10, wherein said transfer assembly initially impacts the article at a slow speed and then accelerates to move the article across said conveying surface in said transfer direction at a faster speed.

12. The conveyor system according to claim 10, wherein said transfer assembly is adapted to selectively translate an article conveyed on said conveying surface between said first portion and said second portion.

13. The conveyor system according to claim 10, wherein said transfer assembly includes a driver, said driver moving said pusher member across said first portion of said conveying surface.

14. The conveyor system according to claim 10, wherein said third conveyor section includes frame, said conveying surface rotatably supported on said frame.

15. The conveyor system according to claim 14, wherein said conveying surface comprises a rotatable belt.

16. The conveyor system according to claim 14, wherein said pusher member is movably supported by said frame on a pair of rails.

17. The conveyor system according to claim 16, wherein said transfer assembly initially moves across said first portion of said conveying surface at a first speed to contact the article and moves the article across said first portion at a second speed, wherein said first speed is less than said second speed to minimize the impact of the transfer assembly on the article.

18. A conveyor system comprising:
a first conveyor section having an output end;
a second conveyor section having an input end, said first conveyor section being offset from said second conveyor section and being generally parallel to said second conveyor section; and
a third conveyor section positioned between said first conveyor section and said second conveyor section and having a conveying surface, said conveying surface having a first portion positioned adjacent said output end of said first conveyor section and a second portion positioned adjacent said input end of said second conveyor section, said third conveyor section including a transfer assembly, said transfer assembly being adapted to translate an article conveyed on said conveying surface between said first portion and said second portion to transfer the article from said first conveyor section to said second conveyor section, said transfer assembly including a pusher member and a driver, said driver moving said pusher member across said first portion of said conveying surface, and said pusher member straddling said conveying surface and including downwardly depending portions, said downwardly depending portions of said pusher member being interconnected by a transverse member, and said transverse member supported by rails.

19. The conveyor system according to claim 18, wherein said transverse member is driven by said driver and moves said pusher member between said retracted position to said fully extended position.

20. The conveyor system according to claim 19, wherein said driver includes a wheel, said wheel engaging said transverse member to drive said transverse member.

21. The conveyor system according to claim 20, wherein said wheel is driven in a circular path to move said pusher member across said first portion of said conveying surface.

22. The conveyor system according to claim 21, wherein said wheel is driven in said circular path with a constant angular velocity whereby said pusher member moves a first speed over said first portion to contact the article conveyed on said conveying surface and moves the article across said first portion a second speed faster than said first speed whereby the impact on the article is minimized while maintaining a high sortation rate.

23. The conveyor system according to claim 22, wherein said transverse member includes a transverse channel, said wheel engaging said transverse channel to move said pusher member between said retracted position and said fully extended position.

24. A conveyor system comprising:
a first conveyor section having an output end;
a second conveyor section having an input end, a third conveyor section positioned between said first conveyor section and said second conveyor section, said first conveyor section and said second conveyor section being substantially parallel and being offset with respect to each other whereby a first portion of said conveying surface of said third conveyor section aligns with said output end of said first conveyor section and a second portion of said conveying surface aligns with said input end of said second conveyor section, and said third conveyor section adapted for moving articles across said first portion of said conveying surface to said second portion of said conveying surface to transfer articles from said first conveyor section to said second conveyor section, said third conveyor section including a pusher member, said pusher member being adapted to selectively translate across said first portion to move an article across said conveying surface to said second portion, said pusher member initially moving across said first portion of said conveying surface at a first speed to contact the article, and said pusher moving the article at a second speed across the conveying surface wherein said first speed is less than said second speed to minimize the impact on the article.

25. A conveyor system comprising:
a first conveyor section having an output end;
a second conveyor section having an input end, a third conveyor section positioned between said first conveyor section and said second conveyor section, said first conveyor section and said second conveyor section being substantially parallel and being offset with respect to each other whereby a first portion of said conveying surface of said third conveyor section aligns with said output end of said first conveyor section and a second portion of said conveying surface aligns with said input end of said second conveyor section, and said third conveyor section adapted for moving articles across said first portion of said conveying surface to said second portion of said conveying surface to transfer articles from said first conveyor section to said second conveyor section, said third conveyor section including a pusher member, said pusher member being adapted to selectively translate across said first portion to move an article across said conveying surface to said second portion; and
a driver and a driver arm, said driver rotating said driver arm, and said driver arm moving said pusher member across said first portion of said conveying surface.

26. The conveyor system according to claim 25, wherein said driver arm rotates in a circular path.

27. The conveyor system according to claim 26, wherein said driver arm initially moves said pusher member at a first speed to provide a low impact with the article and accelerates said pusher member to move the article across said first portion of said conveying surface a second speed greater than said first speed.

28. The conveyor system according to claim 27, wherein said driver arm rotates at a generally constant velocity.

29. The conveyor system according to claim 27, wherein said third conveyor section includes a frame, said conveying surface supported by said frame.

30. The conveyor system according to claim 28, wherein said driver arm de-accelerates said pusher member when said pusher member approaches said extended position whereby the momentum of the article is sufficiently decreased to reduce the momentum of the article when it moves to said second portion of said conveying surface.

31. A transfer assembly for transferring articles between a first conveyor section and a second conveyor section, said transfer assembly comprising:

a conveyor belt defining a conveying surface, said conveying surface defining a direction of flow; and a pusher adapted to move across said conveying surface in a direction generally orthogonal to said direction of flow from a retracted position adjacent said conveying surface to an extended position at least partially across said conveying surface for translating an article being conveyed from the first conveying section in said direction generally orthogonal to said direction of flow for transferring the article from the first conveyor section to the second conveyor section, and said pusher extending across said conveying surface in said direction of flow and straddling said conveyor belt.

32. The transfer assembly according to claim 31, further comprising a frame, said frame supporting said conveying surface, and said pusher being movably supported on said frame.

33. The transfer assembly according to claim 32, wherein said pusher is movably supported on said frame by a pair of rails.

34. The transfer assembly according to claim 33, wherein said pusher moves across a first portion of said conveying surface at a first speed and moves across a second portion of the conveying surface to move the article at a second speed, wherein said first speed is slower than said second speed thereby minimizing the impact on the article.

35. A transfer assembly for transferring articles between a first conveyor section and a second conveyor section, the second conveyor section being offset laterally from the first conveyor section, said transfer assembly comprising:

a conveying surface, said conveying surface defining a direction of flow;

a pusher adapted to move across said conveying surface in a direction generally orthogonal to said direction of flow from a retracted position adjacent said conveying surface to an extended position at least partially across said conveying surface for translating an article being conveyed from the first conveying section in said direction generally orthogonal to said direction of flow for transferring the article from the first conveyor section to the second conveyor section, and said pusher extending across said conveying surface in said direction of flow;

a frame, said frame supporting said conveying surface, and said pusher being movably supported on said frame and straddling said conveying surface, said pusher being movably supported on said frame by a pair of rails; and a driver and a driver arm rotated by said driver, said driver arm moving said pusher member across said conveying surface wherein said pusher moves across a first portion of said conveying surface at a first speed and moves across a second portion of the conveying surface to move the article at a second speed, wherein said first speed is slower than said second speed thereby minimizing the impact on the article.

36. The transfer assembly according to claim 35, wherein said driver arm rotates in a circular path.

37. The transfer assembly according to claim 36, wherein said driver arm rotates at a generally constant angular velocity.

* * * * *